May 30, 1950    F. C. SCHOEN, JR    2,509,533
RIPPLER ATTACHMENT FOR ICING MACHINES
Filed Nov. 27, 1946    2 Sheets-Sheet 1
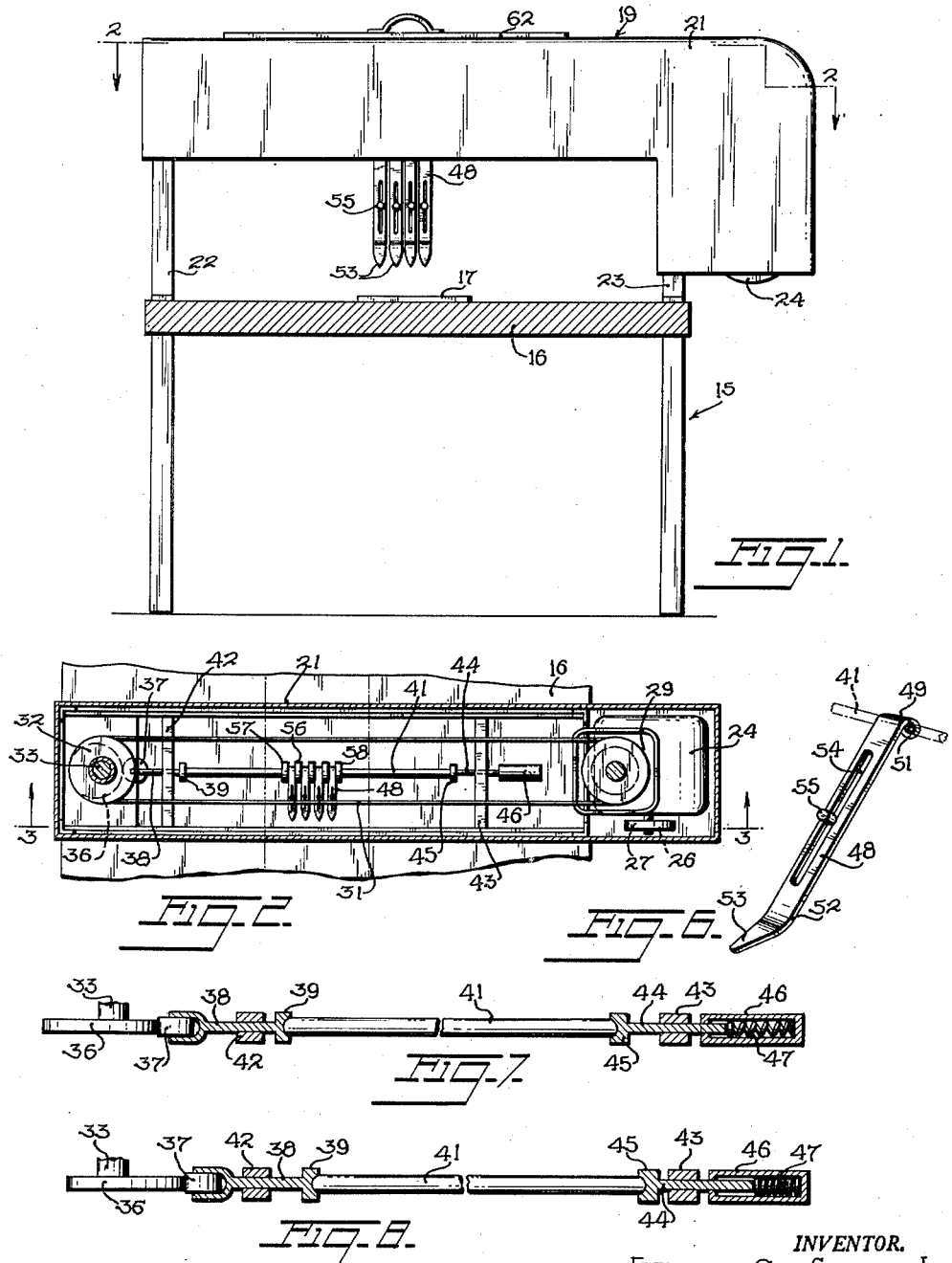
INVENTOR.
FREDERICK C. SCHOEN, JR.
BY
ATTORNEY May 30, 1950  F. C. SCHOEN, JR  2,509,533
RIPPLER ATTACHMENT FOR ICING MACHINES
Filed Nov. 27, 1946  2 Sheets-Sheet 2

INVENTOR.
FREDERICK C. SCHOEN, JR.
BY
ATTORNEY

Patented May 30, 1950

2,509,533

UNITED STATES PATENT OFFICE 2,509,533

RIPPLER ATTACHMENT FOR ICING MACHINES

Frederick Charles Schoen, Jr., Asbury Park, N. J.

Application November 27, 1946, Serial No. 712,641

6 Claims. (Cl. 91—2)

This invention relates to a rippler attachment for icing machines wherein the icing after it has been applied to the cake will be automatically rippled upon the continuation of its movement along a conveyor or upon the cake with its icing being removed from the icing machine and located under rippling tools extending from the rippler attachment.

It is an object of the present invention to provide a machine for placing ripples in the icing disposed on the top of a cake loaf by simply causing the cake loaf with its icing to be passed under rippling tools of the machine.

It is another object of the present invention to provide a rippler attachment for icing machines which is of simple construction, motor operated, consumes little space and wherein the tools thereof may be adjusted upon their support and disposed in such numbers to adapt the attachment to a cake of any width.

It is another object of the invention to provide a rippler attachment wherein the tools themselves are removable from the support and the support removable from the machine whereby the tools and the support can be disassembled from the machine and from one another so that they may be properly rinsed and cleaned.

It is another object of the invention to provide in a rippler machine for cake icings, rippling tools having a weight disposed upon them and readily accessible for adjustment whereby to alter the depth to which the rippling tool enters the icing or to alter the tool for icings of different consistency or hardness.

According to the invention, the rippler attachment can be disposed upon the bed of the icing machine so that the cake loaves on leaving the icing machine will be in alignment with the rippling tools. The rippling tools are carried on a support member which can be easily detached from the machine proper to place on the support an added number of tools or to remove some of the tools already located thereon, or to remove all of the tools for the purpose of cleaning the tools and the support. The support is held in place by two laterally extending members, one of which engages a spring to keep the support in place between the members and the other of which bears against a cam operated by a motor driven mechanism forming a part of the attachment. The spring of the one laterally extending member not only serves to keep the support in place between the members but causes the roller on the other member to follow the cam surface. The individual rippling tools are pivoted upon the support and their points trail over the cake icing. At the same time the support is given a transverse reciprocating movement whereby to give a ripple indentation within the cake icing. The extent to which the rippling tool points enter the cake icing will depend upon the hardness of the icing and the adjustment of the individual weights disposed upon the tools.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an elevational view looking upon the rear face of the rippling attachment, mounted on the table support such as the bed of an icing machine, embodying the features of the present invention.

Fig. 2 is a transverse cross sectional view in plan upon the working parts of the attachment, taken on line 2—2 of Fig. 1.

Fig. 6 is a perspective view of one of the rippling tools with its adjustable weight.

Figs. 7 and 8 are detail views of the tool support, the members for moving the tool support back and forth and the cam acting on one of the members, showing respectively the different positions of the tool support and the members at the opposite end of the stroke.

Figure 3:
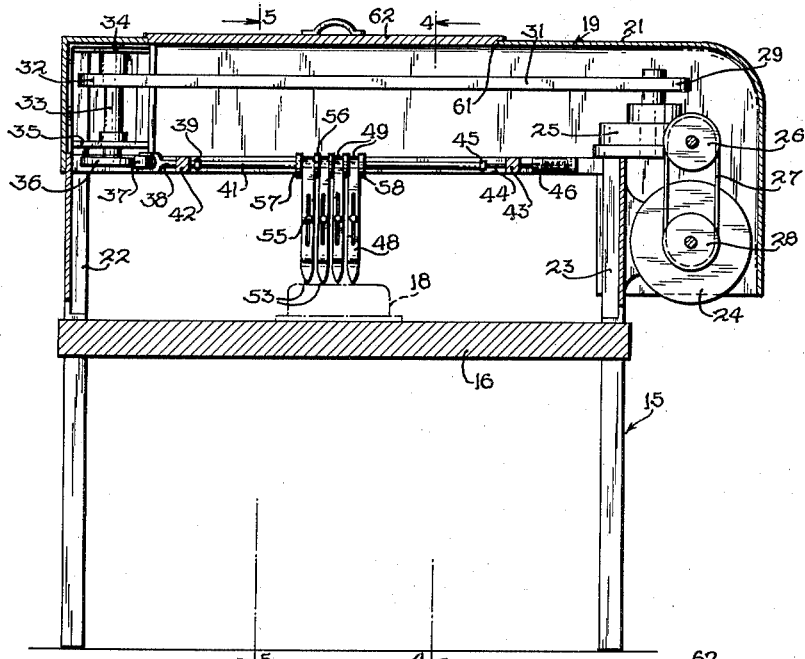
Fig. 3 is a transverse cross sectional view, in elevation, taken on line 3—3 of Fig. 2 looking in the direction of the arrows thereof.
Figures 4, 5:
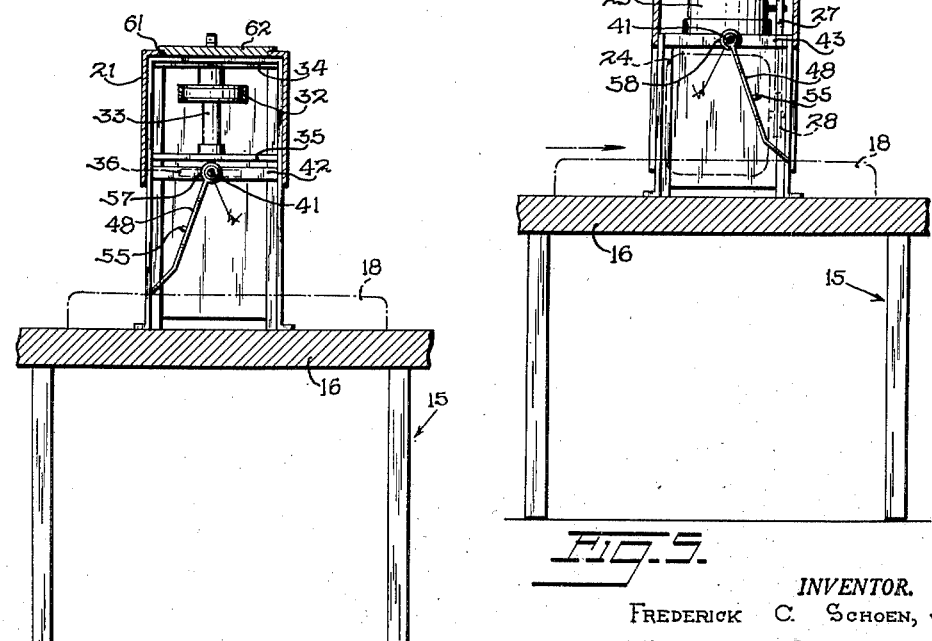
Fig. 4 is a longitudinal cross sectional view taken on line 4—4 of Fig. 3, looking in the directions of their respective arrows.
Fig. 5 is a longitudinal cross sectional view of the same, taken on line 5—5 of Fig. 3.

Referring now to the figures, 15 represents a table support having a top 16. This table support may be the continuation of the bed of an icing machine and can have a conveyor 17 extending thereover for conveying a cake loaf 18 under a rippling machine or attachment 19 embodying the features of the present invention.

The rippling machine comprises a housing 21 extending transversely of the table top and supported upon upright members 22 and 23 located respectively at the sides of the table. One side of the housing 21 extends from the side of the table top and houses an electric motor 24 carried on the vertical supports 23. Also on the vertical supports 23 is a reduction gear unit 25 having an input drive pulley 26 driven through a belt 27 from a pulley 28 on the motor 24. The reduction gear unit 25 has an output pulley 29 which drives a belt 31 extending horizontally through the housing 21 for connection with a pulley 32 on a vertically extending shaft 33 journalled in bearing units 34 and 35 at the opposite side of the housing 21. This shaft 33 has a cam 36 at its lower end adapted to operate a roller 37 and an axial slidable member 38 to urge the member laterally toward the side of the housing having the motor. This member 38 has a head 39 adapted to removably receive and contain a tool support bar 41. The member 38 is attached to the housing by means of a transverse member 42 and is axially slidable therethrough.

Horizontally aligned with the transverse member 42 and located at the side of the housing having the motor is a transverse member 43 having an axially slidable member 44 carried therein and having a head 45 for removably receiving and containing the opposite end of the tool support bar 41. The member 44 extends into a casing 46 having a spring 47 therein. This spring 47 is adapted to act upon the member 44 to return the support bar 41 and the cam following roller 37 upon the cam 36 as the retarding portion of the cam is reached. To remove the tool support bar 41 from the members 38 and 44, the spring 47 can be compressed and the tool support bar taken from between the heads of the members.

The tool support bar 41 is round and adapted to receive over the ends of the same one or a number of rippling tools 48. The connecting end of the tool 48 is rolled up as indicated at 49 to provide a round opening 51 for the tool support bar 41. The lower or trailing end of the tool is bent slightly upwardly as indicated at 52 and is pointed as indicated at 53 so as to enter the cake icing and make an indentation therein as the cake is drawn beneath it. The tool is so arranged on the tool support bar that it can pivot upwardly and downwardly and is inclined so that its point 53 is dragged over the cake icing. Each tool 48 is formed intermediate its ends with an elongated slot 54 along which may be adjusted a weight 55 whereby the extent to which the point 53 enters the cake icing can be controlled. This weight seems necessary to adapt the machine for use with icings of different hardness. One or more of these tools can be disposed upon the tool support bar 41. They may be held spaced from one another by spacers 56 on the support bar and retained together on the support bar by collars 57 and 58 located upon the bar at opposite sides of the group of tools.

With the tool points resting upon the cake a rippling effect will be given if while the cake loaf is being drawn thereunder the tool support bar 41 supporting the tools is reciprocated back and forth as by means of the cam 36 and the spring 47.

The top of the housing may have an opening 61 through which access can be gained to certain of the operating parts of the attachment. The opening 61 is closed by a cover 62.

At times when it is desired that the tools be cleaned, the tool support bar 41 and the tools can be readily removed from the machine and by releasing the collars 57 and 58, the tools 48 can be slid from the tool support bar and individually cleaned.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a rippling machine for cake icings having a support over which a cake is passed and a housing suspended above the support in a direction extended at right angles to the direction in which the cake moves and provided at one end with a vertical driven shaft, a cam mounted on the lower end of the vertical shaft, spaced traverse members supported within the housing one adjacent said cam and the other spaced from said cam on the same side of said cam as said one traverse member, members axially slidably supported by said traverse members in axial alignment with each other, heads formed on the inner ends of said slidable members for supporting a tool support bar, a tool support bar engaged between said heads, rippling tools depending at an inclination from said support bar to engage the icing of the cake passing over the support, a roller mounted on the free end of said slidable member supported by said one traverse member for engaging said cam to move said slidable member and in turn said tool support bar in one direction as the cam turns, and means urging the slidable member supported by said other traverse member for urging said slidable member into a position in which said tool support bar will be clamped between the heads of said slidable member and said roller will be urged into contact with said cam.

2. In a rippling machine for cake icings having a support over which a cake is passed and a housing suspended above the support in a direction extended at right angles to the direction in which the cake moves and provided at one end with a vertical driven shaft, a cam mounted on the lower end of the vertical shaft, spaced traverse members supported within the housing one adjacent said cam and the other spaced from said cam on the same side of said cam as said one traverse member, members axially slidably supported by said traverse members in axial alignment with each other, heads formed on the inner ends of said slidable members for supporting a tool support bar, a tool support bar engaged between said heads, rippling tools depending at an inclination from said support bar to engage the icing of the cake passing over the support, a roller mounted on the free end of said slidable member supported by said one traverse member for engaging said cam to move said slidable member and in turn said tool support bar in one direction as the cam turns, and means urging the slidable member supported by said other traverse member for urging said slidable member into a position in which said tool support bar will be clamped between the heads of said slidable member and said roller will be urged into contact with said cam, said means comprising a casing having one open end supported by the housing and into the open end of which the free end of the slidable member supported by said other traverse member is slidably engaged, and an expansion spring within said casing and operating between the free end of said slidable member supported by said other traverse member and the closed end of said casing.

3. In a rippling machine for cake icings having a support over which a cake is passed and a housing suspended above the support in a direction extended at right angles to the direction in which the cake moves and provided at one end with a vertical driven shaft, a cam mounted on the lower end of the vertical shaft, spaced traverse members supported within the housing one adjacent said cam and the other spaced from said cam on the same side of said cam as said one traverse member, members axially slidably supported by said traverse members in axial alignment with each other, heads formed on the inner ends of said slidable members for supporting a tool support bar, a tool support bar engaged between said heads, rippling tools depending at an inclination from said support bar to engage the icing of the cake passing over the support, a roller mounted on the free end of said slidable member supported by said one traverse member for engaging said cam to move said slidable member and in turn said tool support bar in one direction as the cam turns, and means urging the slidable member supported by said other traverse member for urging said slidable member into a position in which said tool support bar will be clamped between the heads of said slidable member and said roller will be urged into contact with said cam, and means for weighting the free ends of said rippling tools so as to cause their free ends to engage into the surface of the icing of the cake.

4. In a rippling machine for cake icings having a support over which a cake is passed and a housing suspended above the support in a direction extended at right angles to the direction in which the cake moves and provided at one end with a vertical driven shaft, a cam mounted on the lower end of the vertical shaft, spaced traverse members supported within the housing one adjacent said cam and the other spaced from said cam on the same side of said cam as said one traverse member, members axially slidably supported by said traverse members in axial alignment with each other, heads formed on the inner ends of said slidable members for supporting a tool support bar, a tool support bar engaged between said heads, rippling tools depending at an inclination from said support bar to engage the icing of the cake passing over the support, a roller mounted on the free end of said slidable member supported by said one traverse member for engaging said cam to move said slidable member and in turn said tool support bar in one direction as the cam turns, and means urging the slidable member supported by said other traverse member for urging said slidable member into a position in which said tool support bar will be clamped between the heads of said slidable member and said roller will be urged into contact with said cam, each of said rippling tools being formed with an elongated slot intermediate its ends, and a weight slidable in said elongated slot to be adjustable along the length of said elongated slot to vary the pressure with which the free end of the rippling tool will engage the cake icing.

5. In a rippling machine for cake icings having a support over which cakes having icings are passed with a tool support bar extended laterally above the support and slidably supported for axial reciprocation and drive means connected to the support bar for reciprocating the same, a plurality of rippling tools pivotally supported at their top ends on the support bar and having their bottom ends resting on the icings of the cakes, said tools being extended in a downwardly inclined direction and having turned up pointed ends engaging the cake icings, and means for weighting said tools to be pivoted downward and press into the icings.

6. In a rippling machine for cake icings having a support over which cakes having icings are passed with a tool support bar extended laterally above the support and slidably supported for axial reciprocation and drive means connected to the support bar for reciprocating the same, a plurality of rippling tools pivotally supported at their top ends on the support bar and having their bottom ends resting on the icings of the cakes, said tools being extended in a downwardly inclined direction and having turned up pointed ends engaging the cake icings, and means for weighting said tools to be pivoted downward and press into the icings, said weighting means comprising a weight for each of said tools, each of said tools having an elongated slot intermediate the ends thereof and said weights being mounted in said slots and movable to desired positions along the lengths thereof.

FREDERICK CHARLES SCHOEN, Jr.

REFERENCES CITED

The following references are of record in the file of this patent:

UNITED STATES PATENTS

| Number | Name | Date |
| --- | --- | --- |
| 288,370 | Schwemlein | Nov. 13, 1883 |
| 439,360 | Smith | Oct. 28, 1890 |
| 990,175 | Walker | Apr. 18, 1911 |
| 1,004,233 | Bertollotti et al. | Sept. 26, 1911 |
| 2,320,297 | Perkins | May 25, 1943 |
| 2,338,340 | Latini | Jan. 4, 1944 |